Figure 1:
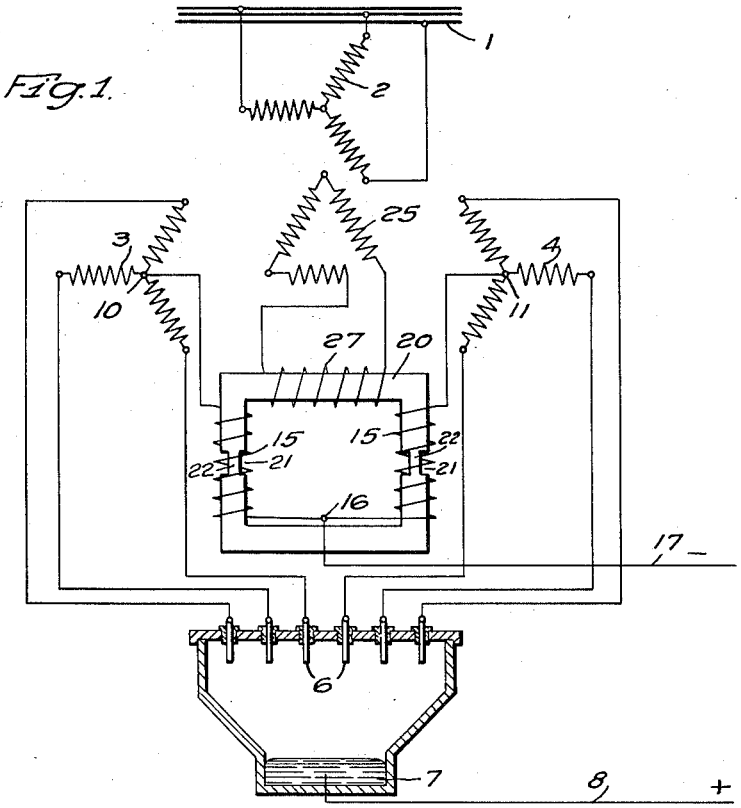

Oct. 9, 1934.   H. A. ROSE   1,976,580
CURRENT TRANSLATING SYSTEM
Filed June 4, 1932

WITNESSES:
E. A. McCloskey
S. A. Stricklett

INVENTOR
Herbert A. Rose.
BY O. B. Buchanan
ATTORNEY

Patented Oct. 9, 1934

1,976,580

UNITED STATES PATENT OFFICE 1,976,580

CURRENT TRANSLATING SYSTEM

Herbert A. Rose, Wilkinsburg, Pa., assignor to Westinghouse Electric & Manufacturing Company, East Pittsburgh, Pa., a corporation of Pennsylvania Application June 4, 1932, Serial No. 615,311

6 Claims. (Cl. 175—363)

My invention relates to a current translating system and particularly to a transformer for a vapor electric device having means for maintaining interphase voltage substantially independently of the load on said system.

In the operation of current translating devices such as mercury arc rectifiers it has been found advisable to provide a polyphase supply transformer having a plurality of secondary groups connected to the rectifier anodes and to compel parallel operation of anodes connected to the different secondary groups by providing an interphase transformer which acts to equalize the anode potentials.

An interphase transformer usually comprises a plurality of branches having the outer terminals connected to the mid-points or neutral points of the secondary transformer groups and having the mid-point of the interphase winding connected to one branch of the direct current system. Consequently, the interphase windings tend to carry substantially equal direct current components all flowing in the same direction from the direct current connection. Also the interphase winding carries an alternating current component superimposed on the direct current, which is the exciting current of the interphase transformer.

In interphase systems heretofore used, difficulty has been experienced in maintaining the interphase voltage at low loads on the rectifier system. When the interphase voltage requirements are not maintained, the terminal or output voltage of the rectifier will rise an amount dependent upon the type of transformer connection used. The rise usually starts at a light load on the rectifier and gradually increases to the maximum value at no load. The change in voltage transformation ratio is the result of a change in the mode of operation of the rectifier and associated transformer equipment. For example in the common double thru phase rectifier and transformer connection with interphase transformer, the change is from double thru phase operation at the heavier loads to six phase diametrical operation at the light loads, resulting in a voltage rise of 15 percent. This rise in voltage is often objectionable from the standpoint of overvoltage on the connected electrical equipment.

The transformer system of my invention comprises a main transformer having a polyphase star connected primary winding and a plurality of secondary windings for connection with the anodes and an interphase transformer having interphase windings connected between secondary winding groups. The interphase transformer is provided with an auxiliary exciting winding for maintaining the desired interphase voltages independently of the direct load current from which the interphase transformer normally draws exciting current.

Since the voltage in the interphase winding, necessary to maintain the parallel anodes at substantially equal voltage, must be a harmonic of the system frequency, it is desirable to provide excitation from a source having the necessary harmonic values. To secure this harmonic excitation I provide an auxiliary winding in the main transformer system. If this auxiliary winding is a polygonal winding, it not only supplies the harmonic excitation necessary for the interphase transformer but allows harmonic currents to flow which effectively eliminate harmonic voltages which would otherwise appear in the alternating current system. It is often desirable to control these harmonic voltages in order to minimize or to control certain system losses or inductive interference with other electrical systems.

Figure 2:
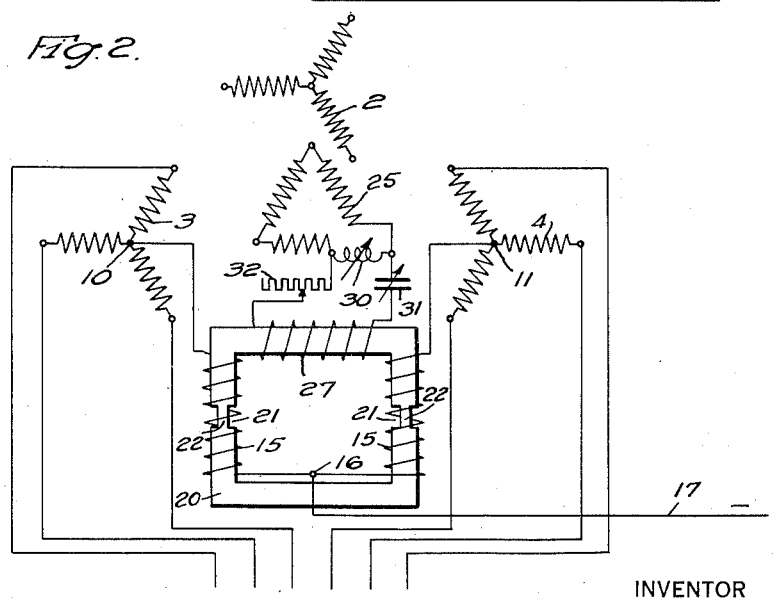

Other objects and advantages of my invention will be apparent from the following detailed description taken in conjunction with the accompanying drawing, in which Figure 1 is a schematic illustration of a current translating system embodying my invention, and Fig. 2 illustrates a modification embodying means for shifting the phase of the exciting current for the interphase transformer.

In the embodiment of my invention disclosed in Fig. 1, the alternating current supply system 1 is connected to a Y-connected primary 2 of the supply transformer. A plurality of Y-connected secondaries 3 and 4 have their terminals connected to the anodes 6 of an asymmetric conductor such as a vapor electric device, the cathode 7 of which is connected to the positive bus 8 of a direct current system. The mid-points 10—11 of the Y-connected secondaries 3—4 are connected to the terminals of a multi-branch interphase winding 15, the mid-point 16 of which is connected to the negative bus 17 of the direct current system.

The interphase winding 15 is associated with a magnetic core 20 which is provided with one or more substantially non-magnetic portions 21 which serve as gaps for preventing saturation of the core by unbalance in the direct current flowing in the parallel branches of the interphase winding.

I prefer to provide magnetic bridges 22 of small cross-section for eliminating the effects of the gaps when the direct currents are balanced or when the direct currents are of low value as shown in the application, Serial No. 614,795, of A. J. Maslin, filed June 1, 1932.

In order to allow certain harmonic currents to flow, which is desirable in such rectifier systems, I provide a polygonal winding such as the delta-connected auxiliary winding 25 in the main transformer. The corner of the delta is opened to which is connected a suitable exciting winding 27 associated with the core 20 of the interphase transformer. The harmonic voltages generated in the delta 25 are in this way used to supply the necessary exciting currents for the interphase transformer.

In some instances, it will be found that the phase relation of the currents for the interphase transformer and the delta are not correct to obtain the desired operating results. To produce the desired phase shift I provide impedances such as a reactor 30, condensers 31 or resistances 32, or any desired combination of these, between the delta winding 25 and the exciting winding 27.

While I have shown and described two specific embodiments of my invention it is apparent that changes and modifications could be made therein without departing from the spirit and scope of my invention. I desire, therefore, that only such limitations shall be imposed as are embodied in the accompanying claims or as may be necessitated by the prior art.

I claim as my invention:

1. In a current translating system including an alternating-current system, an asymmetric conducting device and a direct-current system, a star connected transformer winding for connection to the alternating-current system, a plurality of windings for connection to the asymmetric conducting device, a delta winding inductively associated with said windings, an interphase winding connected between the windings connected to the asymmetric conductor, an exciting winding associated with the interphase winding, said exciting winding being connected across the delta winding, and means for displacing the phase relation of the currents supplied to the interphase transformer.

2. A transformer system for supplying a substantially constant voltage to a rectifier comprising a main transformer primary for connection with an alternating-current circuit, a plurality of secondary windings for connection to the rectifier, a multi-branch interphase transformer connected between the secondary windings, a winding in the main transformer for generating a voltage of a frequency which is a harmonic of the fundamental frequency and a winding in said interphase transformer energized by said harmonic voltage.

3. A transformer system for supplying a substantially constant voltage to an asymmetric conducting device comprising a main transformer primary for connection with an alternating-current circuit, a plurality of secondary windings for connection to the asymmetric conductor, a multi-branch interphase transformer connected between the secondary windings, a winding for generating a voltage of a frequency which is a harmonic of the fundamental frequency and an exciting winding in said interphase transformer energized by said harmonic voltage, and impedance means for altering the phase angle of the harmonic current in the exciting winding.

4. A rectifier transformer comprising a Y-connected primary, a plurality of Y-connected secondary groups, a direct current carrying winding connected between the secondary winding groups, a direct current lead connected to said winding, a magnetizable core in said winding, an exciting winding associated with said core, a delta auxiliary winding in said transformer said delta winding being closed through the exciting winding, substantially non-magnetic portions in said core for preventing saturation by unbalance of direct current in the direct current carrying winding and means for making the non-magnetic portion ineffective at low values of current in the direct current carrying winding.

5. In a current translating system including a direct-current system an alternating-current system and a vapor-electric device for transferring energy from one system to the other, a transformer comprising a winding connected to the alternating-current system, a plurality of windings connected to the vapor-electric device, an auxiliary winding in said transformer, an interphase transformer having a plurality of winding branches, each of said branches having a terminal connected to one of the windings connected to the vapor-electric device, a terminal common to all of the branches of the interphase transformer said terminal being connected to the direct-current system and an exciting winding on said interphase transformer said exciting winding being energized from the auxiliary winding.

6. A transformer system for an asymmetric conducting device comprising a star-connected primary winding, a plurality of star-connected secondary windings, a direct-current carrying winding connected between the secondary windings, a direct-current lead connected to said direct-current carrying winding, a magnetizable core in said winding, an exciting winding associated with said core, a polygonal auxiliary winding in said transformer, and means for energizing said exciting winding from the polygonal winding.

HERBERT A. ROSE.